No. 774,833. PATENTED NOV. 15, 1904.
H. J. DAVIS & P. G. AULT.
AUTOMATIC BOILER FEEDER.
APPLICATION FILED FEB. 15, 1904.
NO MODEL. 5 SHEETS—SHEET 1.
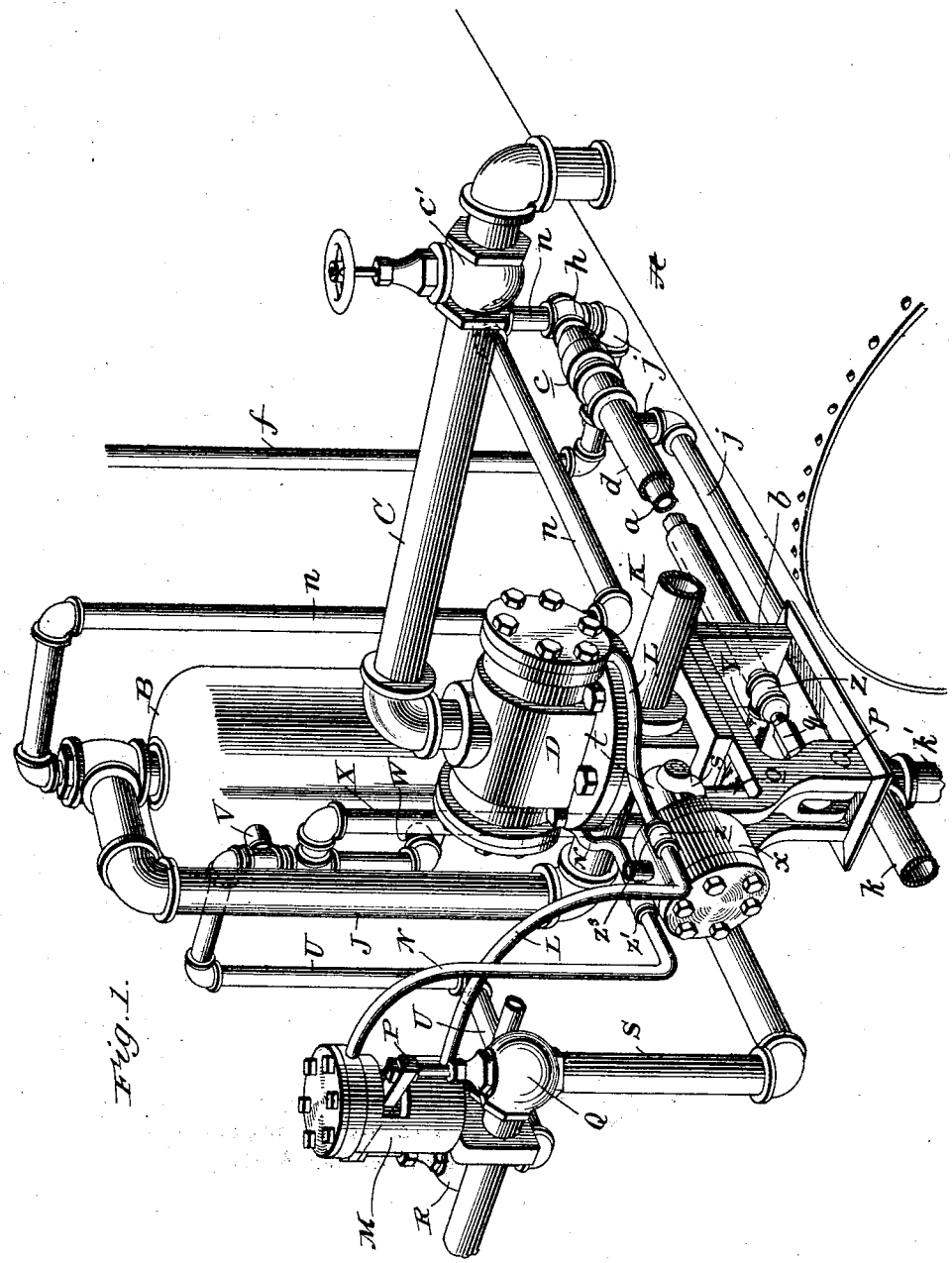
Witnesses
Inventors
Henry J. Davis and
Playfair G. Ault
By
Attorneys No. 774,833. PATENTED NOV. 15, 1904.
H. J. DAVIS & P. G. AULT.
AUTOMATIC BOILER FEEDER.
APPLICATION FILED FEB. 15, 1904.
NO MODEL. 5 SHEETS—SHEET 2.
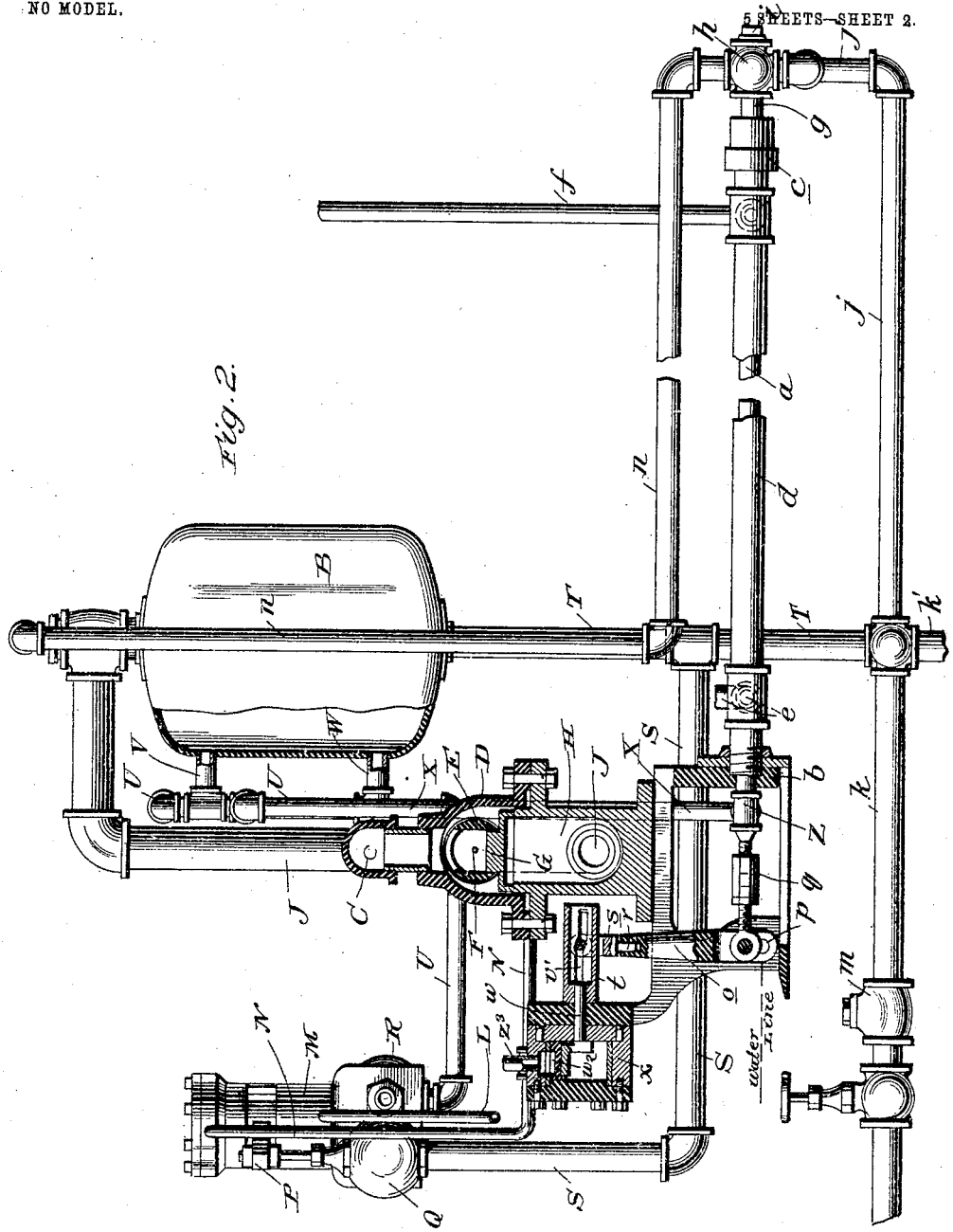
Witnesses
Inventors
Henry J. Davis & Playfair G. Ault,
By
Attorneys.

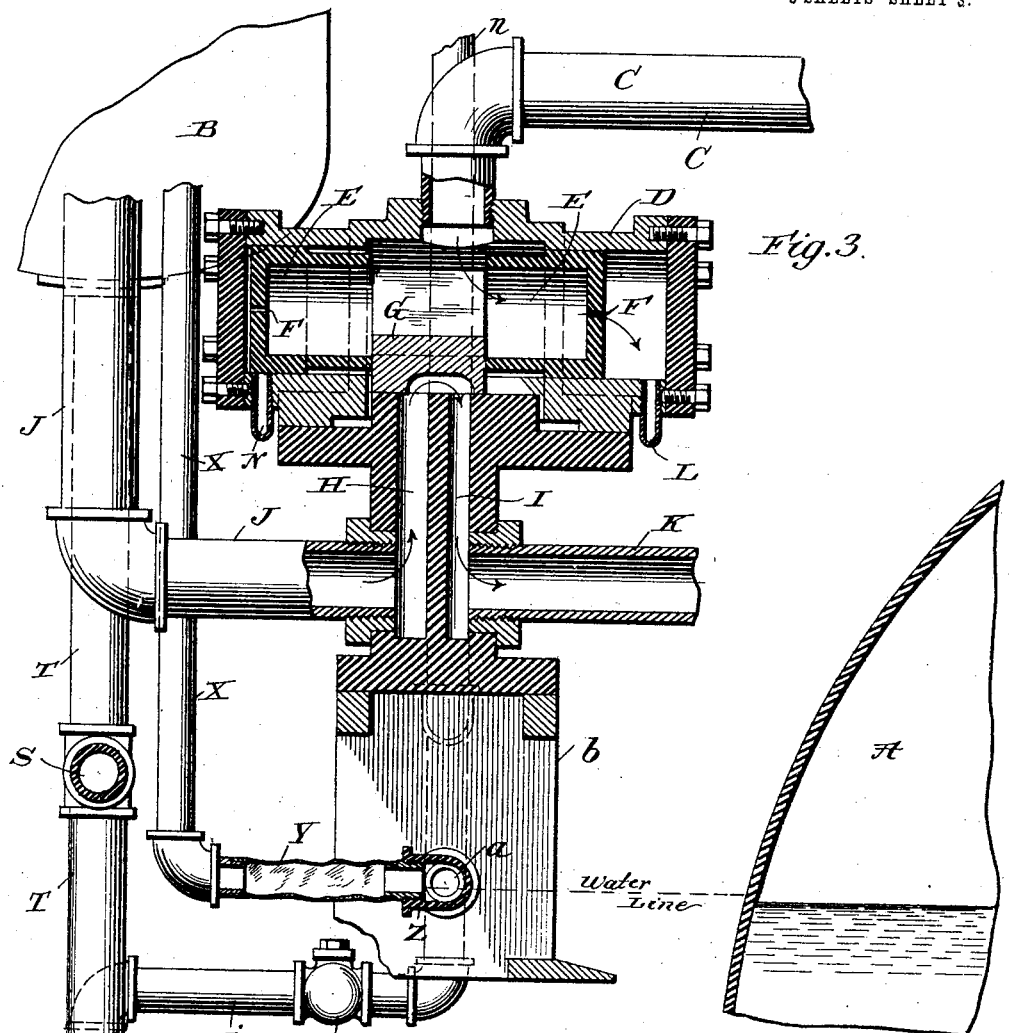

No. 774,833. PATENTED NOV. 15, 1904.
H. J. DAVIS & P. G. AULT.
AUTOMATIC BOILER FEEDER.
APPLICATION FILED FEB. 15, 1904.
NO MODEL. 5 SHEETS—SHEET 4.
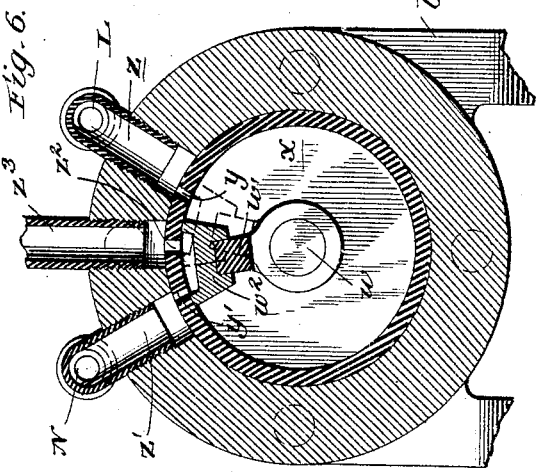
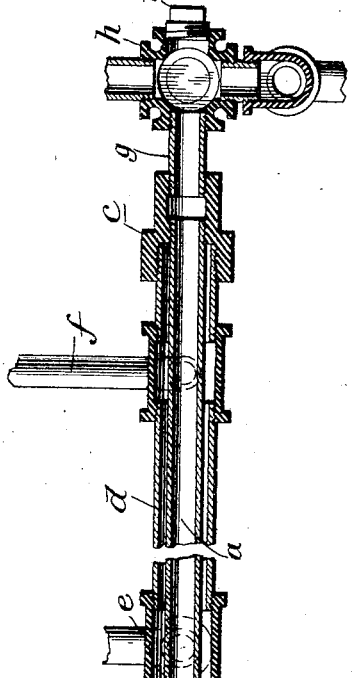
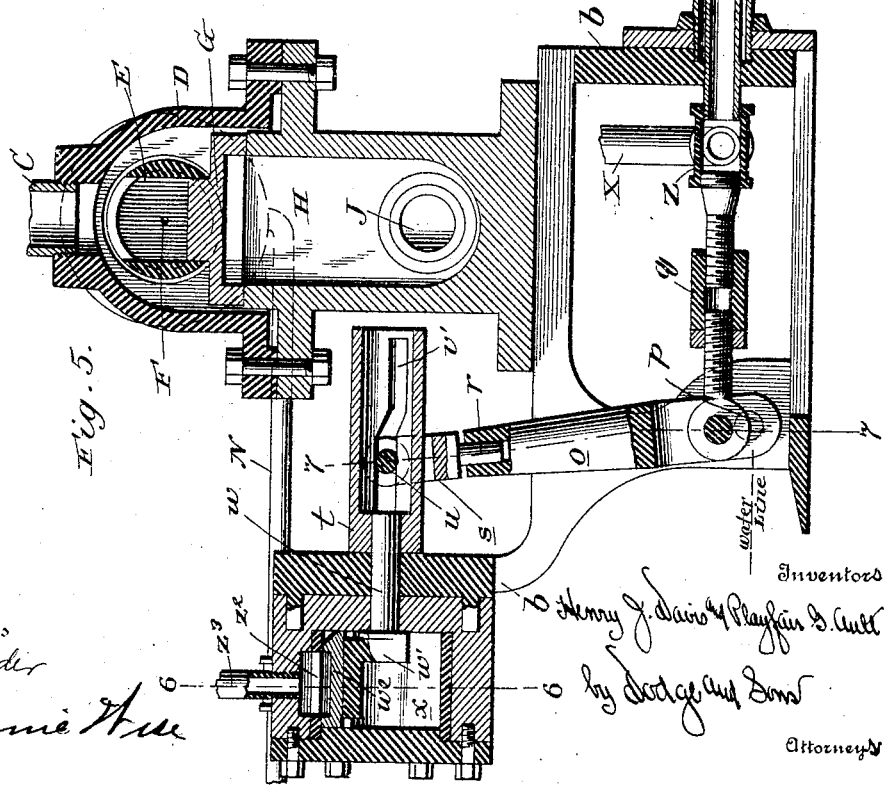

No. 774,833. PATENTED NOV. 15, 1904.
H. J. DAVIS & P. G. AULT.
AUTOMATIC BOILER FEEDER.
APPLICATION FILED FEB. 15, 1904.

NO MODEL. 5 SHEETS—SHEET 5.

Witnesses
Inventors
Henry J. Davis and Playfair G. Ault,
By Dodge and Sons
Attorneys No. 774,833.

Patented November 15, 1904.

UNITED STATES PATENT OFFICE.

HENRY JACKSON DAVIS AND PLAYFAIR GOODWIN AULT, OF BIRMINGHAM, ALABAMA.

AUTOMATIC BOILER-FEEDER.

SPECIFICATION forming part of Letters Patent No. 774,833, dated November 15, 1904.

Application filed February 15, 1904. Serial No. 193,612. (No model.)

*To all whom it may concern:*

Be it known that we, HENRY JACKSON DAVIS and PLAYFAIR GOODWIN AULT, citizens of the United States, residing at Birmingham, in the county of Jefferson and State of Alabama, have invented certain new and useful Improvements in Automatic Boiler-Feeders, of which the following is a specification.

Our present invention pertains to improvements in automatic boiler-feeders, the construction and advantages of which will be hereinafter set forth, reference being had to the annexed drawings, wherein—

Figure 7:
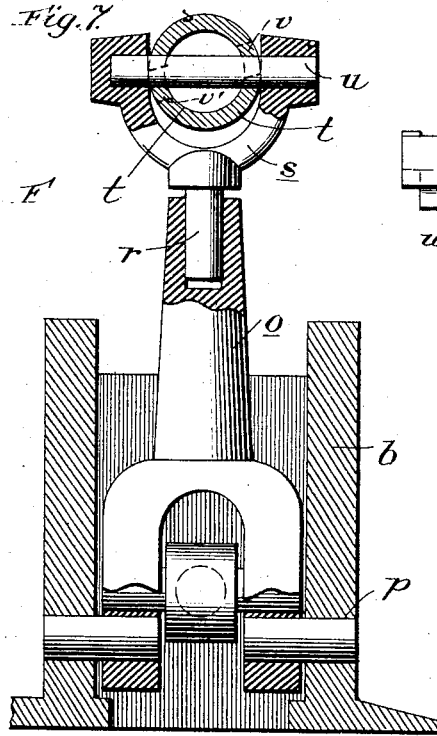
Figure 8:
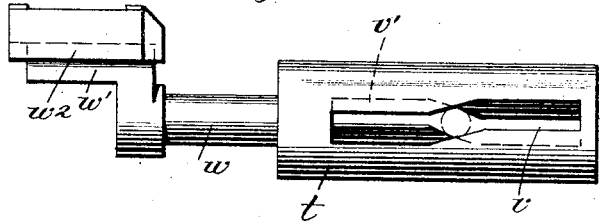
Figure 9:
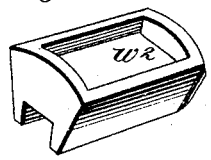
Figure 10:
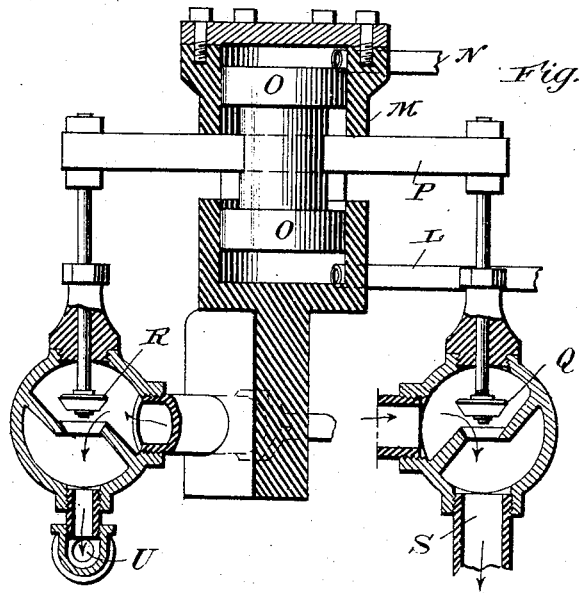

Figure 1 is a perspective view of the apparatus; Fig. 2, an elevation thereof, portions being shown in section; Fig. 3, an elevation, on an enlarged scale, partly in section, showing the construction of the piston-actuated steam-controlling valve and certain of the connections; Fig. 4, a similar view of the valve, the same being differently positioned; Fig. 5, a longitudinal sectional view of the thermostatic controlling mechanism and its connections, the main steam-valve being shown in transverse section; Fig. 6, a sectional view of the auxiliary controlling-valve, taken on the line 6 6 of Fig. 5; Fig. 7, a sectional elevation of the rocker-arm, taken on the line 7 7, Fig. 5; Fig. 8, a side elevation of the auxiliary valve and valve-shifter; Fig. 9, a perspective view of the auxiliary valve, and Fig. 10 a vertical sectional view of the mechanism for controlling the valves which in turn govern the supply of water to the feeder.

The main object of our invention is to produce an automatic boiler-feeder in which the water will flow by gravity from the supply-tank, the mechanism controlling the flow being actuated by a thermostatic device which is at certain periods subjected to varying degrees of temperature, according to the height of the water in the boiler. The advantages of the construction and the other objects sought to be accomplished thereby will be set forth in the following description.

Referring to the drawings, A denotes the steam-boiler, and B the supply-tank. Steam passes from the boiler through a pipe C to the enlarged central portion of a cylinder D, the ends of which are closed. Mounted within said cylinder is a hollow double-headed piston E, said piston having a lateral opening formed centrally thereof, the upper end of the opening being in line with the discharge of steam-supply pipe C. Each head or end of the piston is provided with a small opening F, the purpose of which will presently appear. The upwardly-projecting portion of a D slide-valve G extends into the lateral opening in the piston and moves with the latter. Said valve controls the ports H and I, port H communicating with a pipe J, which leads into the upper end of tank B, while port I communicates with an exhaust-pipe K. With the parts in the positions shown in Fig. 3 steam may pass from the tank and exhaust through pipe K to the atmosphere or otherwise, as desired.

A pipe L is connected to the right-hand end of cylinder D, said pipe passing to and communicating with the chamber formed in the lower end of a double cylindrical member M. A second pipe N extends from the opposite end of cylinder D and in turn communicates with the chamber formed in the upper portion of said cylindrical member M. A double-headed piston O works in said cylinder M, being alternately raised and lowered as steam enters the lower end thereof through pipe L and exhausts from the upper end through pipe N, and vice versa.

A cross-bar P is carried by the piston O, (see Fig. 10,) one end being connected to the stem of a valve Q and the other to the stem of a valve R. Both valves normally close with the water-pressure, valve Q controlling the main water-supply, which passes to tank B through pipes S and T. Valve R controls the passage of water to a pipe-line U, said pipe-line being connected into the tank near its upper end through a branch V and into the lower end of the tank by a lateral or branch W.

A pipe X, hereinafter termed the "overflow-pipe," is connected into pipe-line U and extended down to a point below tank B. A flexible connection or pipe Y extends from the lower end of pipe X and joins said pipe with a T or coupling Z. Said T is connected at one end to a pipe $a$, which forms the thermostatic or expansion member, said pipe passing freely through an opening formed in a supporting frame or casting $b$ and being screwed into a reducer $c$. The pipe is preferably surrounded by another pipe or jacket $d$ of somewhat larger diameter, said latter pipe or jacket being provided with two or more outlets, as indicated in Fig. 5, a pipe $e$ extending from one to a point remote from the boiler where the air is cooler and a second pipe $f$ extending upwardly from the second opening in order to induce a draft, and thus cause a current of cooled air to pass constantly about the expansion pipe or member. The pipe or jacket $d$ is rigidly fixed at one end to the supporting frame or casting $b$, while its opposite end is connected to the reducer $c$. A nipple $g$ connects the small end of the reducer with a coupling $h$, which carries a plug $i$, in line with the pipe $a$, in order that said pipe may be cleaned out when necessary. A pipe $j$ extends from the coupling and is connected into the main discharge line or pipe $k$, a check-valve $l$ being placed in pipe $j$, thus permitting the outflow of water from pipe $a$ to pipe $j$ through nipple $g$ and coupling $h$, but preventing the return of the water therethrough. Pipe T is also connected into the main discharge-pipe $k$, (see Figs. 2 and 3,) and a check-valve $m$ prevents a return flow of water through said pipe $k$.

A pipe $n$ extends from coupling $h$ to the upper end of the tank, a portion of said pipe being horizontally disposed, or substantially so, and overlying the expansion member, as shown in Figs. 1 and 2.

A rocker-arm $o$ is pivoted at $p$ to the supporting-frame $b$, said arm being connected to the coupling Z by a turnbuckle $q$. The upper end of the rocker-arm is provided with a central opening into which extends the post or stem $r$ of a yoke $s$. The arms of the yoke pass up on opposite sides of a cylindrical member or rocker $t$, a pin $u$, carried by said arms, passing through slots $v$ $v'$, formed in the rocker. (See Figs. 5, 7, and 8.) The effective portions of the slots are inclined, the inclination being in opposite directions in the two slots, so that as the pin is moved the rocker will be given a partial rotation. The slots are extended in a horizontal line to each side of the inclined portion in order to provide for a full throw of the yoke and pin without changing the position of the rocker after the inclined portions of the slots have been passed. This permits a greater movement of the rocker-arm than is absolutely necessary in order to effect a proper rotation thereof; but the same is provided in view of the fact that the member $a$ will be expanded and contracted to a greater or less extent in accordance with its variations in temperature. In any event the rocker-arm will be moved a distance sufficient to traverse the pin over the inclined portions of the slots. By swiveling the yoke and providing for the desired longitudinal play between it and the arm there will be no cramping or binding of the parts. Connected to the rocker is a stem $w$, which passes into a valve-chamber $x$, supported upon the frame or casting $b$. Said chamber is provided with a port $y$, which communicates through a branch connection $z$ with pipe L. A second port $y'$ communicates through branch $z'$ with pipe N. A third port $z^2$ opens to the atmosphere through a pipe $z^3$. The inner end of stem $w$ has secured to it a valve-carrier $w'$, an auxiliary controlling-valve $w^2$ of the form shown in Fig. 9 being mounted thereon and working beneath the ports $y$, $y'$, and $z^2$, placing one or the other of ports $y$ $y'$ into communication with the exhaust $z^2$, according to the position of the valve.

A blow-off $k'$, provided with a valve $k^2$, Fig. 3, is employed in connection with the main discharge-line $k$.

The operation of the apparatus is as follows: The valve $c'$ being opened, steam is admitted to cylinder D, the piston E and valve G at such time occupying the position shown in Fig. 3. Steam will pass from port F at the right of piston E through pipe L into the lower end of cylinder M, valve $w^2$ then occupying the position shown in Fig. 6, whereby pipe N is open to the atmosphere through connection $z'$, port $y'$, port $z^2$, and pipe $z^3$. At the same time the tank is open to the atmosphere through pipe J, port H, valve G, port I, and pipe K, Fig. 3. The steam entering cylinder M serves to elevate piston O and open the valves Q and R, thereby permitting the water to enter the tank through pipes S and U. The valves will remain open and the water continue to flow until the tank is completely filled. As the tank becomes nearly full the water will pass therefrom through overflow-pipe X and flexible connection Y into the expansion-pipe $a$. The entrance of the water into pipe $a$ cools and contracts the same, whereby the rocker-arm $o$ is moved, thus shifting the regulating or controlling valve $w^2$ to the position shown in dotted lines, Fig. 6. This vents pipe L and allows valves Q and R to be immediately closed by the pressure of the water thereon. At the same time piston E will be forced to the right or to the position shown in Fig. 4, steam passing through port F at the left into pipe N, thence into the upper end of cylinder M, acting upon piston O and serving to hold valves Q and R closed. Steam will also pass directly to the tank B by way of the enlarged chamber formed in cylinder D, port H, and pipe J, so that as soon as the level of the water in the boiler falls below the predetermined line it will flow by gravity into the boiler through pipes T and $k$. When the water has discharged from the system to the level of the expansion-pipe $a$, steam enters the same, causing it to expand and shifting the regulating-valve, as above described. The cold water which passes down into pipe $a$ as the tank is nearly filled will force out any warm water which may remain in said pipe, the warm water backing into the horizontally-disposed portion of pipe $n$. This pipe $n$ therefore performs the functions of admitting steam to the expansion-pipe $a$, venting said pipe, and forming a reservoir for any hot water which may be driven therefrom, as just noted.

The pipe $d$ may, if desired, be omitted from the structure if the surrounding atmosphere be sufficiently cool. In such case, however, means must be provided to secure the outer end of the expansion-pipe and frame $b$ in a fixed relation in order that the rocker-arm may be properly actuated by the expansion and contraction of the pipe $a$. Again, if the feed-water be sufficiently cool the overflow-pipe X may be connected directly into the upper portion of the tank, in which case valve R and the pipe connections between it and the tank may be dispensed with.

It is obvious that many other changes may be made in the apparatus without departing from the broad scope of the invention.

In installing the boiler-feeder the expansion-pipe should be given a slight elevation at its outer end or that end to which the flexible pipe Y is connected in order that it may be properly drained.

Having thus described our invention, what we claim is—

1. In combination with a steam-boiler, a feed-tank; a water-supply pipe leading thereto; a valve for controlling said pipe; a steam-actuated mechanism for opening and closing said valve; a pipe leading from the tank to the water-space of the boiler; a steam-supply pipe leading to the feed-tank; a valve mechanism interposed in said pipe; steam-pipes leading from said valve mechanism to the controlling mechanism of the water-supply valve; an auxiliary controlling-valve governing the passage of steam through said steam-pipes; and a thermostatic device, controlled by the height of water in the boiler, for actuating said controlling-valve.

2. In combination with a steam-boiler, a feed-tank; a water-supply pipe leading thereto; a valve for controlling said pipe; a steam-actuated mechanism for opening and closing said valve; a pipe leading from the tank to the water-space of the boiler; a steam-supply pipe leading from the boiler to the tank; a valve mechanism interposed in said pipe; steam-pipes leading from said mechanism to the mechanism controlling the water-supply valve; an auxiliary valve controlling the passage of steam through said pipe; an actuator for said valve; and a hollow expansible member connected at one end to said actuator and having its opposite end fixed, said member being in communication with the water-space of the boiler, substantially as described.

3. In combination with a steam-boiler, a feed-tank; suitable valve mechanism therefor; a thermostatic device for controlling said valve mechanism, said device comprising an expansible pipe communicating with the water-space of the boiler and tank and with the steam-space of the boiler when the tank is empty; and means for inducing a current of air around said pipe.

4. In combination with a steam-boiler, a feed-tank; suitable valve mechanism therefor; a thermostatic device for controlling said valve mechanism, said device comprising an expansible pipe communicating with the water-space of the boiler and tank, and with the steam-space of the boiler when the feed-tank is empty; a pipe surrounding the expansion-pipe and spaced therefrom; and means for inducing a current of air between said pipes.

5. In combination with a steam-boiler, a feed-tank; a steam-pipe extending from the boiler; a cylinder connected to said pipe; a pipe extending from a port or passage in the cylinder to the tank; a second port or passage leading to the atmosphere from said cylinder; a double-headed piston working in said cylinder, the heads of said piston having ports formed therein; a slide-valve carried by said piston and working over the first-mentioned ports, substantially as described; a steam-actuated supply-valve controlling the passage of water to the tank; pipes extending from opposite ends of the cylinder to said steam-actuated valve; a valve for controlling the passage of steam through said pipes; and mechanism for actuating said valve, said mechanism being controlled by the height of the water in the boiler, substantially as described.

6. In combination with a steam-boiler, a feed-tank; a steam-pipe extending from the boiler; a cylinder connected to said pipe and having two ports, one leading to the tank and the other to the atmosphere; a hollow piston mounted therein, having a restricted port in each end thereof; a valve carried by said piston and working over the first-named ports; a steam-actuated supply-valve controlling the passage of water to the tank; steam-pipes extending from opposite ends of the cylinder to said steam-actuated valve; a valve for venting one or the other of said pipes to the atmosphere; and a thermostatic device for actuating said valve, said device being controlled by the height of the water in the boiler, substantially as described.

7. In combination with a steam-boiler, a feed-tank; a steam-pipe extending from the boiler; a cylinder connected to said pipe and having two ports therein, one leading to the tank and the other to the atmosphere; a piston mounted in said cylinder; a valve actuated by said piston and moving over the ports to open the steam-supply to the tank or to vent the tank to the atmosphere; a water-supply leading to the tank; a valve for controlling said supply; a second line of piping leading to the tank; a valve for controlling said second line; a cylinder; a piston mounted in said cylinder and operatively connected with the water-supply valves; pipes leading from the first to the second cylinder, one or the other of said pipes being at all times in communication with the steam-space of the boiler; an auxiliary valve located intermediate the first and second cylinders controlling the passage of steam through the aforesaid pipes; an expansion-pipe located at the desired water-line in the boiler; a connection between said pipe and the water-space of the boiler; a second connection extending from the upper end of the tank to the opposite end of said pipe; and connections intermediate said expansion-pipe and the intermediate valve for controlling the position of the valve according as the pipe is contracted or expanded.

8. In combination with a steam-boiler, a supply-tank; an expansion-pipe located in the plane of the desired water-level in the boiler; a pipe extending from the tank adjacent to one end of the expansion-pipe; a flexible connection intermediate said pipe and the expansion-pipe; a pipe extending from the upper portion of the tank and connected to the opposite end of the expansion-pipe; a valve; connections intermediate said valve and the expansion-pipe, whereby said valve may be shifted to one or another position according as said pipe is expanded or contracted; and means for controlling the flow of water and steam to and from the tank, said means being governed by said valve, substantially as described.

9. In combination with a steam-boiler, a feed-tank; a water-supply pipe leading thereto; a valve located in said pipe; a steam-actuated mechanism for controlling the position of said valve; a steam-pipe leading from the boiler; a valve located in said pipe for controlling the passage of steam to the tank or venting the tank to the atmosphere; an expansion-pipe; a pipe connecting said expansion-pipe with the steam-space of the boiler; a second pipe extending from the water-space in the tank down and adjacent to the opposite end of the expansion-pipe; a flexible connection intermediate said expansion-pipe and said second pipe; steam-pipes leading from the controlling-valve to the actuating mechanism of the water-supply valve; an auxiliary valve located intermediate said controlling-valve and the valve-actuating mechanism; a rocker connected to said auxiliary valve; a pivoted rocker-arm working in conjunction with said rocker; and connections intermediate said rocker-arm and the free end of the expansion-pipe.

In testimony whereof we have signed our names to this specification in the presence of two subscribing witnesses.

HENRY JACKSON DAVIS.
PLAYFAIR GOODWIN AULT.

Witnesses:
L. W. MARTYN, Jr.,
H. W. COFFIN.